United States Patent [19]
Yui et al.

[11] Patent Number: 5,977,207
[45] Date of Patent: Nov. 2, 1999

[54] INK JET RECORDING INK AND INK JET RECORDING METHOD

[75] Inventors: Toshitake Yui; Atsushi Suzuki; Nobuyuki Ichizawa; Kunichi Yamashita; Ken Hashimoto, all of Minami-ashigara, Japan

[73] Assignee: Fuji Xerox Co., Ltd., Tokyo, Japan

[21] Appl. No.: 08/852,607

[22] Filed: May 7, 1997

[30] Foreign Application Priority Data

May 27, 1996 [JP] Japan .................................. 8-132424

[51] Int. Cl.$^6$ .................................................. C03C 17/00
[52] U.S. Cl. .................................................. 523/160
[58] Field of Search .............................................. 523/160

[56] References Cited

U.S. PATENT DOCUMENTS

| | | | |
|---|---|---|---|
| 4,221,606 | 9/1980 | Funatsu | 106/288 |
| 4,321,870 | 3/1982 | Zasloff | 101/473 |
| 4,465,492 | 8/1984 | Putzar | 8/589 |
| 4,469,516 | 9/1984 | Schneider | 106/23 |
| 4,680,235 | 7/1987 | Murakami | 428/414.4 |
| 5,085,698 | 2/1992 | Ma et al. | 106/20 |
| 5,172,133 | 12/1992 | Suga et al. | 346/1.1 |
| 5,221,334 | 6/1993 | Ma et el. | 106/20 |
| 5,593,459 | 1/1997 | Gamblin | 8/589 |
| 5,667,571 | 9/1997 | Ono | 106/31.48 |
| 5,679,143 | 10/1997 | Looman | 106/20 |
| 5,695,820 | 12/1997 | Davis | 427/261 |
| 5,713,993 | 2/1998 | Page | 106/31.85 |

FOREIGN PATENT DOCUMENTS 56-147871  11/1981  Japan .

*Primary Examiner*—Paul R. Michl
*Attorney, Agent, or Firm*—Oliff & Berridge, PLC

[57] ABSTRACT

An ink jet recording ink comprising water, a coloring material such as carbon black, (a) a dispersant containing at least one of a sulfonic acid group, sulfuric ester, and salt thereof, such as a polystyrenesulfonate polymer, and (b) a dispersant above-mentioned dispersants is preferably from 0.1 to 20 parts by weight based on 10 parts by weight of the coloring material. Further, the pH, surface tension, and viscosity of the ink are preferably from 7.0 to 10.0, from 30 to 65 mN/m, and from 1.0 to 10.0 mPa·s, respectively. Dispersion stability for a long period of time is improved, kogation in the thermal ink jet method is prevented, and excellent fixation on paper is obtained containing a carboxyl group or salt thereof, such as a styrene-maleate polymer, wherein the ratio by weight of (a) to (b) is from 1:5 to 1:100.

13 Claims, No Drawings

INK JET RECORDING INK AND INK JET RECORDING METHOD

BACKGROUND OF THE INVENTION

1. Field of the Invention

The present invention relates to a novel ink jet recording ink, used in a method for ink jet recording, and an ink jet recording method.

2. Description of the Related Art

So-called ink jet printers capable of recording images on paper, cloth, or a film by discharging a liquid or molten solid ink through nozzles, slits, a porous film, and the like have advantages of small size, low cost, low noise, and the like, and have been widely put on the market as black monochrome or color printers. Among them, a so-called piezoelectric ink jet method using a piezoelectric element or a so-called thermal ink jet method, which conducts recording by applying thermal energy to form liquid drops, has many advantages such as high-speed printing, high resolution, and the like.

Many characteristics are required of ink jet recording ink. Among them, the following characteristics are important:

(1) Excellent images free of omissions and unevenness are obtained irrespective of printing speed and printing pattern.
(2) In the thermal ink jet method, there is no kogation due to temperature change on a heater which forms and develops bubbles at high temperatures, and there is no short-circuiting of acting electrodes in the heater portion that would prevent the heater from operating (fail) by eroding a material usually in contact with an ink.
(3) The ink can be stored for a long period of time.
(4) The formed images have excellent storage stability.
(5) The formed images have excellent fixing properties.

There have conventionally been many suggestions that have been carried out to provide the above-mentioned characteristics.

Among conventional ink jet recording inks, an ink using an aqueous dye as a coloring material is mainly used. However, it has problems in water resistance and lightfastness, and the storage stability of images is not necessarily satisfactory. On the other hand, an ink using a pigment as a colorant can improve water fastness and lightfastness, and can provide an image having high optical density and no blotting. Therefore, this ink is very promising and there have recently been many suggestions concerning the ink which have been put into practice. For example, Japanese Patent Application Laid-Open (JP-A) No. 56(1981)-147871 suggests a recording liquid comprising an aqueous medium containing at least a pigment, a high-molecular dispersant, and a nonionic surfactant. Further, U.S. Pat. Nos. 5,085,698 and 5,221,334 suggest the use of a block copolymer comprising hydrophilic polymer portion-hydrophobic polymer portion or hydrophobic polymer portion-hydrophilic polymer portion-hydrophobic polymer portion as a dispersant for a pigment. Further, U.S. Pat. No. 5,172,133 suggests the use of a specific pigment, water-soluble resin, and solvent. However, in the conventionally suggested inks, stability for a long period of time, including environmental changes, may not be easily attained. Further, when a metal or metal oxide exists on an ink flow route in a cartridge-constituting material or print-head-constituting material, a pigment is deposited on them, and consequently, stable ejection is liable to be disturbed (namely, clogging) and excellent fixation cannot be provided on various papers. Particularly, in the ink jet recording method, there is a disadvantage that the pigment deposited on a heater comprising a metal such as tantalum causes kogation due to temperature rising in printing and remarkably shortens the life of the print head.

SUMMARY OF THE INVENTION

The object of the present invention is to solve the above-mentioned technical problems and to provide an ink jet recording ink and an ink jet recording method which satisfy all characteristics required.

The present inventors have found, as a result of intensive study, that the above-mentioned problems can be solved and, further, that the other characteristics required can be satisfied by using an ink jet recording ink comprising water, a coloring material, (a) a dispersant containing at least one of a sulfonic acid group, sulfuric ester, and salt thereof, and (b) a dispersant containing a carboxyl group or salt thereof, wherein the ratio by weight of (a) to (b) is from 1:5 to 1:100, and have accomplished the present invention.

DESCRIPTION OF THE PREFERRED EMBODIMENTS

The present invention will be described in detail hereinafter.

The ink of the present invention comprises water, a coloring material, (a) a dispersant containing at least one of a sulfonic acid group, sulfuric ester, and salt thereof, and (b) a dispersant containing a carboxyl group or salt thereof.

As water used in the present invention, ion-exchanged water, ultrapure water, distilled water, and ultrafiltrated water are preferably used to prevent contamination with impurities.

The coloring material used in the present invention contains a pigment and dye. Examples of the pigment include inorganic pigments such as zinc oxide, titanium white, chromium oxide, iron oxide, alumina white, cadmium yellow, zinc sulfide, zinc chromate, chrome yellow, barium sulfate, basic lead sulfate, calcium carbonate, lead white, ultramarine blue, calcium silicate, manganese violet, cobalt violet, Prussian blue, carbon black, and the like; organic pigments such as madder lake, cochineal lake, naphthol green B, naphthol green Y, naphthol yellow S, permanent red 4R, hansa yellow, benzidine yellow, lithol red, lake red C, lake red D, brilliant carmine 6B, bordeaux 10B, phthalocyanine blue, phthalocyanine green, sky blue, rhodamine lake, methyl violet lake, quinoline yellow lake, peacock blue lake, thioindigo maroon, alizarin lake, quinacrydone red, perylene red, aniline black, dioxazine violet, organic fluorescent pigment, isoindolinone yellow, and the like; magnetic materials or superparamagnetic materials such as cobalt oxide, γ-iron oxide, metal iron powder, magnetite such as barium ferrite and the like, ferrite and the like; other plastic pigment and metal gloss pigment; and the like. The above-described pigments and other pigments can be appropriately selected according to the hue used.

On the other hand, as the dye, various dyes soluble or slightly soluble in water, for example, dispersing dyes and oil-soluble dyes, can be used. Examples of such dyes include C. I. Disperse Black 1, C. I. Disperse Black 2, C. I. Disperse Black 3, C. I. Disperse Black 4, C. I. Disperse Black 5, C. I. Disperse Black 6, C. I. Disperse Black 7, C. I. Disperse Black 8, C. I. Disperse Black 9, C. I. Disperse Black 10, C. I. Disperse Black 11, C. I. Disperse Black 12, C. I. Disperse Black 14, C. I. Disperse Black 15, C. I. Disperse Black 20, C. I. Disperse Black 22, C. I. Disperse Black 24, C. I.

Disperse Black 25, C. I. Disperse Black 26, C. I. Disperse Black 27, C. I. Disperse Black 28, C. I. Disperse Black 29, C. I. Disperse Black 30, C. I. Disperse Black 31, C. I. Disperse Black 32, C. I. Disperse Black 33, C. I. Disperse Black 34, C. I. Solvent Black 3, C. I. Solvent Black 5, C. I. Solvent Black 7, C. I. Solvent Black 27, C.- I. Solvent Black 28, C. I. Solvent Black 29, C. I. Solvent Black 34, and the like.

The above-mentioned pigments or dyes may be used alone or in combination with two or more of them. Further, water-soluble dyes may be added in addition to the above-mentioned pigments or dyes.

The pigments for obtaining four-color full-color printed images are exemplified in terms of trade names and C. I. pigment numbers below. The pigments which can be used in the present invention are not limited to them.

Examples of a black pigment include, but are not limited to, carbon black pigments such as furnace black, lamp black, acetylene black, channel black, and the like, and, more particularly, include Raven 7000, Raven 5750, Raven 5250, Raven 5000 ULTRA-, Raven 3500, Raven 2000, Raven 1500, Raven 1250, Raven 1200, Raven 1190 ULTRA-II, Raven 1170, and Raven 1255 (the above-mentioned compounds are manufactured by Columbian Carbon Corp.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan XC-72R (the above-mentioned compounds are manufactured by Cabot Corp.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (the above-mentioned compounds are manufactured by Degussa Corp.); No. 25, No. 33, No. 40, No. 47, No. 52, No. 900, No. 2300, MCF-88, MA600, MA7, MA8, and MA100 (the above-mentioned compounds are manufactured by Mitsubishi Chemical Corp.); and the like. Further, magnetic fine particles such as magnetite, ferrite and the like, and titanium black and the like, can also be used as the black pigment.

Examples of a cyan pigment include, but are not limited to, C. I. Pigment Blue 1, C. I. Pigment Blue 2, C. I. Pigment Blue 3, C. I. Pigment Blue 15, C. I. Pigment Blue 15:1, C. I. Pigment Blue 15:3, C. I. Pigment Blue 15:34, C. I. Pigment Blue 16, C. I. Pigment Blue 22, C. I. Pigment Blue 60, and the like.

Examples of a magenta pigment include C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red168, C. I. Pigment Red 184, C. I. Pigment Red 202, and the like.

Examples of a yellow pigment include, but are not limited to, C. I. Pigment Yellow 1, C. I. Pigment Yellow 2, C. I. Pigment Yellow3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 151, C. I. Pigment Yellow 154, and the like.

In addition to a black pigment and three primary color pigments of cyan, magenta, and yellow, specific color pigments such as red, green, blue, brown, white, and the like; pigments having metallic gloss such as gold, silver, and the like; and colorless extender pigments, plastic pigments, and the like may be used in the present invention. Further, pigments which are synthesized for achieving the objects of the present invention can be used. It is preferable to remove organic and inorganic impurities from these pigments for the purpose of the-prevention of clogging, and kogation on a heater in the thermal ink jet method. In particular, it is desired that the concentration of calcium, iron, silicon, magnesium, phosphorus, zinc, and the like in an ink be 5 ppm or less. Such removal can be conducted by washing with water, ultrafiltration method, ion exchange treatment, and adsorption by activated charcoal, zeolite, and the like.

Further, the surface treatment of a pigment can be conducted beforehand. For example, surface treatment with alcohols such as ethanol, propanol, and the like; treatment with surfactants; pigment derivative treatment in which acid groups or basic groups are substituted; pigment coating reaction treatment in which the surface of a pigment is coated with other materials; surface chemical reaction treatment in which substituents are introduced by condensation reactions or graft reactions; coupling reaction treatment in which surface treatment is conducted with silane-based coupling agents; titanate-based coupling agents, zirconate-based coupling agents, aluminate-based coupling agents and the like; and plasma reaction treatment, CVD treatment, and the like can be conducted.

As the dispersants, (a) a dispersant containing at least one of a sulfonic acid group, sulfuric ester, and salt thereof (hereinafter, referred to as a sulfonic-based dispersant), and (b) a dispersant containing a carboxyl group or salt thereof, (hereinafter, referred to as a carboxyl-based dispersant) are used together.

Examples of the sulfonic-based dispersant include styrene sulfonic acid and salt thereof, styrene-styrenesulfonic acid copolymer and salt thereof, vinylsulfonic acid and salt thereof, vinyl-vinylsulfonic acid copolymer and salt thereof, dodecylbenzenesulfonic acid and salt thereof, chelylbenzenesulfonic acid and salt thereof, isopropylnaphthalenesulfonic acid and salt thereof, monobutylphenylphenol-monosulfonic acid and salt thereof, monobutylbiphenylsulfonic acid and salt thereof, dibutylphenylphenoldisulfonic acid and salt thereof, and formalin consensation product of. naphthalenesulfonic acid and salt thereof, and the like.

As the carboxyl-based dispersant, a copolymer composed of a monomer as a hydrophilic group and a monomer as a hydrophobic group and salt thereof are listed. Examples of the monomer as a hydrophilic group include $\alpha$, $\beta$-ethylenically unsaturated carboxylic acids, $\alpha$, $\beta$-ethylenically unsaturated carboxylic acid derivatives, acrylic acid, acrylic acid derivatives, methacrylic acid, methacrylic acid derivatives, maleic acid and maleic acid derivatives, itaconic acid and itaconic acid derivatives, fumaric acid and fumaric acid derivatives, and the like. Further, examples of the monomer as a hydrophobic group include styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkylesters of acrylic acid, alkylesters of methacrylic acid, and the like. Examples of the salt include, but are not limited to, alkaline metals, onium compounds such as ammonium ion, organic ammonium ion, phosphonium ion, sulfonium ion, oxonium ion, stibonium ion, stannonium, iodonium, and the like. Further, a polyoxyethylene group, hydroxyl group, acrylamide, acrylamide derivatives, dimethylaminoethyl methacrylate, ethoxyethyl methacrylate, butoxyethyl methacrylate, ethoxytriethylene methacrylate, methoxypolyethylene glycol methacrylate, vinyl pyrrolidone, vinyl pyridine, polyvinyl alcohol, and alkyl ether and the like may appropriately be added to the above-mentioned polymers and salts thereof.

The copolymers used as the above-mentioned sulfonic-based dispersant and carboxyl-based dispersant may have any structure of random, block, graft copolymer, and the like. Further, any dispersant may have low molecular weight, and the weight-average molecular weight thereof is preferably from 1000 to 10000, more preferably from 2000 to 8000, further preferably from 2500 to 7000, in consideration of the dispersion stability of coloring materials.

In both sulfonic-based dispersants and carboxyl-based dispersants, the balance of hydrophilic groups and hydrophobic groups is important. There are various specific values to express this ratio, and, for example, the ratio of the molecular weight of hydrophobic groups in each component to the molecular weight of the component is preferably from 0.2 to 0.9, more preferably from 0.3 to 0.8.

The ratio by weight of the sulfonic-based dispersants to the carboxyl-based dispersants is required to be in the range from 1:5 to 1:100, and is more preferably from 1:5 to 1:50, further preferably from 1:6 to 1:20. It is not preferable if the ratio by weight of the carboxyl-based dispersants to the sulfonic-based dispersants is less than 5, since clogging is liable to occur, and it is not preferable if the ratio by weight exceeds 100, since kogation is liable to occur.

Examples of preferable combinations of the sulfonic-based dispersants and the carboxyl-based dispersants include the combination of a polystyrenesulfonate polymer and a styrene-maleate block polymer, the combination of a naphthalenesulfonic acid formalin condensation salt polymer and a styrene-n-butyl methacrylate-methacrylate terpolymer, the combination of a polystyrenesulfonate and a styrene-methoxytriethylene glycol methacrylate-methacrylate terpolymer, and the like.

The addition ratio of the dispersants is usually from 0.01 to 50 parts by weight, preferably from 0.1 to 20 parts by weight in terms of the total amount of the sulfonic-based dispersants and the carboxyl-based dispersants based on 10 parts by weight of pigments, though general prescription is impossible since the ratio differs widely depending on the pigments.

Regarding these inks, the addition of bases gives better dispersion stability. For example, potassium hydroxide, sodium hydroxide, lithium hydroxide, ammonium hydroxide, triethanolainine, diethanolamine, ethanolamine, 2-amino-2-methyl-1-propanol, ammonia, andthelikecanbeused. Also, usual pH buffering agents can be used, and the pH of an ink is preferably from 7.0 to 10.0, more preferably from 7.5 to 9.5.

The surface tension of the above-mentioned ink is preferably from 30 to 65 mN/m. It is not preferable if the surface tension of the ink is less than30 mN/m, since blotting is liable to occur and discharging is unstable, and it is not preferable if the surface tension of the ink exceeds 65 mN/m, the wetting property on a print head and paper is poor and drying time is lengthened.

Further, the viscosity of the above-mentioned ink is preferably from 1.0 to 10.0 mPa·s. It is not preferable if the viscosity of the ink is less than 1.0 mPa·s, since production is difficult, and it is not preferable if the viscosity of the ink exceeds 10.0 mPa·s, since discharging stability is poor and clogging is liable to occur. The viscosity is more preferably from 1.0 to 5.0 mPa·s.

An ink usually comprises a water-soluble organic solvent to satisfy various required properties. The examples of the water-soluble organic solvent include polyhydric alcohols such as ethylene glycol, diethylene glycol, propylene glycol, butylene glycol, triethylene glycol, 1,5-pentanediol, 1,2,6-hexanetriol, glycerin, and the like; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and the like; nitrogen-containing solvents such as pyrrolidone, N-methyl-2-pyrrolidone, cyclohexylpyrrolidone, triethanolamine, and the like; alcohols such as ethanol, isopropyl alcohol, butyl alcohol, benzyl alcohol, and the like; or sulfur-containing solvents such as thiodiethanol, thiodiglycerol, sulfolane, dimethylsulfoxide, and the like; and propylene carbonate, ethylene carbonate, and the like.

Various surfactants can be used for controlling the surface tension of an ink, and nonionic and anionic surfactants which influence dispersion conditions slightly are preferred. Examples of the nonionic surfactant include polyoxyethylenenonylphenyl ethers, polyoxyethyleneoctylphenyl ethers, polyoxyethylenedodecylphenyl ethers, polyoxyethylenealkyl ethers, polyoxyethylene fatty esters, sorbitan fatty esters, polyoxyethylene sorbitan fatty esters, fatty acid alkylolamides, acetylene alcohol ethyleneoxide adduct, polyethylene glycol polypropylene glycol block copolymer, and the like. As the anionic surfactant, the salt of phosphoric ester may be added. Further, as ampholytic surfactants, betaine, sulfo betaine, sulfate betaine, imidazoline, and the like can be used. Further, silicone-based surfactants such as polysiloxanepolyoxyethylene adduct and the like, fluorine-based surfactants such as oxyethyleneperfluoroalkyl ether and the like, biosurfactants such as spicrispolic acid, rhamnolipid, resorcitin, and the like can be used as the other surfactants.

The ink jet recording ink of the present invention can comprise polyethyleneimine, polyamines, polyvinylpyrrolidone, polyethylene glycol; cellulose derivatives such as ethyl cellulose, carboxymethyl cellulose, and the like; polysaccharides and derivatives thereof; and water-soluble polymers, cyclodextrin, macrocyclic amines, dendrimer, crown ethers, urea and derivatives thereof, acetamides, and the like in addition to the above-mentioned components, to control the characteristics of the ink. Further, the ink jet recording ink can optionally comprise an antioxidant, antifungal agent, viscosity regulator, electro-conductive agent, ultraviolet-ray absorbing agent, chelating agent, and the like.

The ink jet recording ink of the present invention can be prepared, for example, by adding a predetermined amount of a coloring material to an aqueous solution containing a predetermined amount of a sulfonic-based dispersant and carboxyl-based dispersant; stirring the mixture completely; dispersing the mixture using a dispersing machine; removing coarse particles in the mixture by centrifugal separation and the like; adding a desired solvent, additive, and the like to the disperse system; stirring the resulting mixture; and filtering the mixture. As the dispersing machine, any commercially available one can be used. For example, a colloid mill, flow jet mill, slusher mill, high-speed disperser, ball mill, attritor, sand mill, sand grinder, ultrafine mill, aigar motor mill, dinau mill, pearl mill, agitator mill, cobol mill, three-roll, two-roll, extruder, kneader, ultimizer, microfluidizer, laboratoryhomogenizer, supersonic homogenizer, and the like may be used and these may be used alone or in combination. Also, desired solvents may mixed, and a predetermined amount of a sulfonic-based dispersant and carboxyl-based dispersant may be added, then, a coloring material may be added and dispersing may be conducted using a dispersing machine.

The ink jet recording ink of the present invention can also be used for a recording apparatus equipped with a heater to aid in the fixing of an ink to a paper sheet, and a recording apparatus equipped with an intermediate transfer mechanism, in addition to conventional ink jet recording apparatuses which conduct recording by discharging ink drops from orifices in response to recording signals. In particular, a recording apparatus which discharges ink drops by using a heating means is preferably used.

It is not apparent why dispersion stability is obtained, clogging does not easily occur, fixation on various papers is improved, and deposition on a metal or metal oxide does not occur. However, it is hypothesized that these effects operate even under wide environmental conditions because of chemical and physical balance of two kinds of dispersants.

EXAMPLES

The present invention will be illustrated more particularly in accordance with the following examples.

Example 1

| Dispersion A | (parts by weight) |
| --- | --- |
| Carbon black<br>Raven 5250, manufactured by Columbian Carbon Corp. | 10 |
| Sodium polystyrenesulfonate polymer<br>weight-average molecular weight 4500,<br>sulfonation degree 90% | 0.1 |
| Styrene-potassium maleic anhydride copolymer<br>weight-average molecular weight 2000,<br>styrene/maleic anhydride = 1/2,<br>acid value 220 | 1.5 |
| Ultrapure water | 70 |

The above-described components were mixed, and stirred for 30 minutes and then dispersed by a cobol mill (medium: zirconia 1 mm diameter, medium filling ratio: 60%), and the coarse particles in the mixture were removed by a centrifugal separator to obtain dispersion.

|  | (parts by weight) |
| --- | --- |
| Dispersion A | 50 |
| Diethylene glycol | 10 |
| Isopropyl alcohol | 3 |
| Surfinol 465 | 0.05 |
| Ultrapure water | 36.95 |

The above-mentioned components were mixed and the coarse particles in the mixture were removed again by a centrifugal separator to obtain an ink. using this ink, the following tests were conducted:

(1) Ink Surface Tension

The surface tension of the ink was measured using a Wilhelmie type surface tension measuring apparatus in an atmosphere of 23° C. and 55% RH.

(2) Ink Viscosity

The viscosity of the ink was measured at a shearing speed of 1400/s in an atmosphere of 23° C. and 55% RH.

(3) Ink pH

The pH value of the ink was measured using a glass pH electrode in an atmosphere of 23° C. and 55% RH.

(4) Dispersion Stability Test

This ink (100 g) was charged in a glass tube having a lid. The glass tube was sealed with the lid, and this glass tube was allowed to stand for 4 hours in an atmosphere of 70° C. and for 4 hours in an atmosphere of −20° C. This standing procedure at 70° C. and −20° C. was repeated for 4 times for an acceleration test. Pressure filtering was conducted using a 1 μm filter, the time for the ink to pass through the filter was measured, and the dispersion stability of each ink was evaluated according to the following standard:

○ . . . Increase in filter passing time after the acceleration test is less than 10%

Δ . . . Increase in filter passing time after the acceleration test is greater than or equal to 10% and less than 20%

X . . . Increase in filter passing time after the acceleration test is greater than or equal to 20%

(5) Image Quality Test

A printing test was conducted on FX-L paper (manufactured by Fuji Xerox Corp.) and 4024 paper (manufactured by Xerox Corp.) using a prototype ink jet printer (thermal ink jet method, 600 dpi), and the resulting line images were evaluated according to the following standard:

○ . . . No blotting

Δ . . . Slight blotting

X . . . Blotting in the form of whiskers in many parts (6) Fixation Test on Paper Printing was conducted on FX-L paper (manufactured by Fuji Xerox Corp.), 4024 paper (manufactured by Xerox Corp.), and a government-printed postcard using the prototyped machine used in (5), these recording media were allowed to stand for one day, then the image on each recording medium was rubbed with a cotton rod several times, and whether a stain around the image occurred was observed.

(7) Kogation Test

Printing was conducted on FX-L paper (manufactured by Fuji Xerox Corp.) by discharging ink successively from nozzles while applying $1 \times 10^8$ pulses per nozzle to the respective nozzles using the same printer as used in (5). The diameter of the resulting dot was measured, and variation in the dot diameter was evaluated according to the following standard:

○ . . . Variation in dot diameter based on the initial dot diameter is less than 5%

Δ . . . Variation in dot diameter based on the initial dot diameter is greater than or equal to 5% and less than 10%

X . . . Variation in dot diameter based on the initial dot diameter is greater than or equal to 10%

(8) Clogging Test

The printer used in (5), whose nozzles were not covered with caps, was allowed to stand in an atmosphere of 23° C. and 55% RH after discharging of the ink was stopped. Then, an image was formed by using the printer, and it was judged whether this image was of sufficient quality, and if the image was of sufficient quality, the printer was again allowed to stand in an atmosphere of 23° C. and 55% RH after discharging of the ink was stopped. Again, an image was printed and the quality thereof was judged. This process was repeated, each time increasing the length of time until the formation of an image, until an image of insufficient quality was obtained. The period of time corresponding to the formation of the unsatisfactory image was used for evaluation. Clogging difficulty of the ink was evaluated according to the following standard:

○ . . . Greater than or equal to 60 seconds
Δ . . . Greater than or equal to 30 seconds and less than 60 seconds
X . . . Less than 30 seconds Further, the printer used in (5) whose nozzles were not covered with caps was allowed to stand for one week, and then the nozzle was sucked by a suction apparatus installed in the printer, and the number of nozzles which could not discharge ink were measured.

○ . . . All nozzles could discharge ink
X . . . Some nozzles could not discharge ink Examples 2 to 10, Comparative Examples 1 to 6

Dispersions were prepared having compositions shown in Tables 1 and 2 in the same manner, inks were prepared having compositions shown in Tables 3 to 5, and the same tests were conducted. The results of the tests are shown in Tables 6 and 7.

TABLE 1

| Dispersion | Pigment | (Parts by Weight) | | Dispersant | (Parts by Weight) | Water | (Parts by Weight) |
|---|---|---|---|---|---|---|---|
| A | Carbon black (Raven 5250, manufactured by Columbia Corp.) | 10 | (a) | Sodium polystyrenesulfonate polymer (weight-average molecular weight 4500, sulfonation degree 90%) | 0.1 | Ultrapure water | 70 |
| | | | (b) | Styrene-potassium maleate block copolymer (weight-average molecular weight 2000, styrene/maleic = 1/2, acid value 220) | 1.5 | | |
| B | Carbon black (Regal 330, manufactured by Cabot Corp.) | 15 | (a) | Naphthalenesulfonic acid formalin condensation product lithium salt polymer (weight-average molecular weight 4000, sulfonation degree 92%) | 0.3 | Ultrapure water | 70 |
| | | | (b) | Styrene-n-butyl methacrylate-ammonium methacrylate terpolymer (weight-average molecular weight 3000, styrene/n-butyl methacrylate/methacrylic acid = 1/2/2, acid value 350) | 2.0 | | |
| C | Carbon black (Black Pearls L, manufactured by Cabot Corp.) | 15 | (a) | Sodium polystyrenesulfonate polymer (weight-average molecular weight 3000, sulfonation degree 90%) | 0.5 | Ultrapure water | 70 |
| | | | (b) | Styrene-methoxytriethylene glycol methacrylate-potassium methacrylate copolymer (weight-average molecular weight 2000, styrene/methoxytriethylene glycol methacrylate/methacrylic acid = 1/1/3, acid value 300) | 3.0 | | |
| D | Carbon black (No. 258, manufactured by Mitsubishi Chemical Corp.) | 15 | (a) | Sodium polystyrenesulfonate polymer (weight-average molecular weight 6500, sulfonation degree 90%) | 0.2 | Ultrapure water | 70 |
| | | | (b) | Styrene-potassium maleate block copolymer (weight-average molecular weight 2000, styrene/maleic acid = 1/2, acid value 220) | 2.0 | | |
| E | Carbon black (Black Pearls L, manufactured by Cabot Corp.) | 15 | (a) | Lithium polystyrenesulfonate polymer (weight-average molecular weight 4000, sulfonation degree 95%) | 4.0 | Ultrapure water | 70 |

TABLE 2

| Dispersion | Pigment | (Parts by Weight) | | Dispersant | (Parts by Weight) | Water | (Parts by Weight) |
|---|---|---|---|---|---|---|---|
| F | Carbon black (Regal 330, manufactured by Cabot Corp.) | 15 | (b) | Styrene-ammonium maleate block copolymer (weight-average molecular weight 3500, styrene/maleic acid 1/3, acid value 320) | 3.0 | Ultrapure water | 70 |
| G | C. I. pigment red 122 | 10 | (a) | Sodium polystyrenesulfonate polymer (weight-average molecular weight 6500, sulfonation degree 90%) | 0.2 | Ultrapure water | 65 |
| | | | (b) | Styrene-potassium maleate block copolymer (weight-average molecular weight 2000, styrene/maleic acid 1/2, acid value 220) | 2.0 | | |
| H | C. I. pigment blue 15:3 | 10 | (a) | Naphthalenesulfonic acid formalin condensation product lithium salt polymer (weight-average molecular weight 6000, sulfonation degree 92%) | 0.2 | Ultrapure water | 65 |

TABLE 2-continued

| Dispersion | Pigment | (Parts by Weight) | | Dispersant | (Parts by Weight) | Water | (Parts by Weight) |
|---|---|---|---|---|---|---|---|
| | | | (b) | Styrene-n-butyl methacrylate-ammonium methacrylate terpolymer (weight-average molecular weight 5000, styrene/n-butyl methacrylate/methacrylic acid = 1/2/2, acid value 350) | 3.6 | | |
| I | Carbon black (No. 258, manufactured by Mitsubishi Chemical Corp.) | 10 | (a) | Ammonium polystyrenesulfonate (weight-average molecular weight 4500, sulfonation degree 90%) | 0.5 | Ultrapure water | 70 |
| | | | (b) | Styrene-potassium maleate block copolymer (weight-average molecular weight 3000, styrene/maleic acid = 1/1.5, acid value 220) | 1.5 | | |
| J | Carbon black (Valcan XC-72R, manufactured by Cabot Corp.) | 15 | (a) | Naphthalenesulfonic acid formalin condensation product potassium salt polymer (weight-average molecular weight 4000, sulfonation degree 92%) | 0.02 | Ultrapure water | 70 |
| | | | (b) | Styrene-n-butyl methacrylate-sodium methacrylate terpolymer (weight-average molecular weight 3000, styrene/n-butyl methacrylate/methacrylic acid = 1/2/2, acid value 350) | 2.6 | | |

TABLE 3

| Example | Dispersion | (Parts by Weight) | Solvent | (Parts by Weight) | Additive | (Parts by Weight) | Water | (Parts by Weight) |
|---|---|---|---|---|---|---|---|---|
| 1 | A | 50 | Diethylene glycol Isopropyl alcohol | 10 3 | Surfinol 465 (manufactured by Nisshin Kagaku K.K.) | 0.05 | Ultrapure water | 36.95 |
| 2 | B | 55 | Glycerin Thiodiethanol | 12 6 | Polyoxyethyleneoleyl ether Urea | 0.1 5 | Ultrapure water | 21.9 |
| 3 | C | 55 | Ethylene glycol Sulfolane | 15 10 | Polysiloxanepolyoxyethylene adduct | 0.2 | Ultrapure water | 19.8 |
| 4 | C | 50 | Diethylene glycol Sulfolane | 10 10 | Florad FC-104 (manufactured by 3M Corp.) Urea | 0.01 5 | Ultrapure water | 24.99 |
| 5 | D | 50 | 2-pyrrolidone Isopropyl alcohol | 15 3 | Urea | 5 | Ultrapure water | 27 |

TABLE 4

| Example | Dispersion | (Parts by Weight) | Solvent | (Parts by Weight) | Additive | (Parts by Weight) | Water | (Parts by Weight) |
|---|---|---|---|---|---|---|---|---|
| 6 | G | 25 | Diethylene glycol Diethylene glycol monobutyl ether | 10 6 | Pullronic 4300 (manufactured by BASF Corp.) Benzoic acid | 0.5 0.3 | Ultrapure water | 58.2 |
| 7 | H | 30 | Ethylene glycol Diethylene glycol monobutyl ether | 15 9 | Pullronic 6400 (manufactured by BASF Corp.) Urea | 0.5 5 | Ultrapure water | 40.5 |
| 8 | A | 50 | Propylene glycol Isopropyl alcohol | 15 3 | Surfinol 465 (manufactured by Nisshin Kagaku K.K.) | 0.05 | Ultrapure water | 31.95 |
| 9 | B | 55 | Glycerin Thiodiethanol Isopropyl alcohol | 12 6 2.5 | Polyoxyethyleneoleyl ether Urea | 0.1 6 | Ultrapure water | 30.4 |
| 10 | C | 55 | Diethylene glycol Diethylene glycol monobutyl ether | 15 9 | Polysiloxanepolyoxyethylene adduct | 0.2 | Ultrapure water | 20.8 |

TABLE 5

| Comparative Example | Dispersion | (Parts by Weight) | Solvent | (Parts by Weight) | Additive | (Parts by Weight) | Water | (Parts by Weight) |
|---|---|---|---|---|---|---|---|---|
| 1 | E | 50 | Diethylene glycol | 10 | Florad FC-104 (manufactured by 3M Corp.) Urea | 0.01 5 | Ultrapure water | 34.99 |
| 2 | F | 55 | 2-pyrrolidone Isopropyl alcohol | 15 3 | Urea Benzoic acid | 5 3 | Ultrapure water | 19 |
| 3 | E | 50 | Diethylene glycol Diethylene glycol monobutyl ether | 10 6 | Pullronic 4300 (manufactured by BASF Corp.) | 0.5 | Ultrapure water | 33.5 |
| 4 | F | 50 | Glycerin | 15 | Surfinol 465 (manufactured by Nisshin Kagaku K.K.) | 0.05 | Ultrapure water | 19.5 |
| 5 | I | 50 | Ethylene glycol Sulfolane | 10 3 | Urea Surfinol 465 (manufactured by Nisshin Kagaku K.K.) | 6 0.05 | Ultrapure water | 34.95 |
| 6 | J | 50 | Glycerin 1,2,6-hexanetriol | 5 5 | Pullronic 4300 (manufactured by BASF Corp.) | 0.05 | Ultrapure water | 39.95 |

TABLE 6

| Example | *1 | Total amount of dispersants *2 | (1) Ink surface tension | (2) Ink viscosity | (3) Ink pH | (4) Dispersion stability | (5) Image quality test | (6) Fixation test on paper (Stains) | (7) Kogation test | (8) Clogging test Standing time test | (8) Clogging test Dischargeability test | Notes *3 |
|---|---|---|---|---|---|---|---|---|---|---|---|---|
| 1 | 1/15 | 1.6 | 49.0 | 1.90 | 7.9 | ◯ | ◯ | No | ◯ | ◯ | ◯ | Ink pH is controlled using KOH. |
| 2 | 3/20 | 1.53 | 55.0 | 2.12 | 8.1 | ◯ | ◯ | No | ◯ | ◯ | ◯ | Ink pH is controlled using NaOH. |
| 3 | 1/6 | 2.33 | 52.0 | 2.02 | 8.2 | ◯ | ◯ | No | ◯ | ◯ | ◯ | Ink pH is controlled using $NH_4OH$. |
| 4 | 1/6 | 2.33 | 46.0 | 1.95 | 9.0 | ◯ | ◯ | No | ◯ | ◯ | ◯ | Ink pH is controlled using Bicine/LiOH. |
| 5 | 1/10 | 1.47 | 52.0 | 1.92 | 7.3 | ◯ | ◯ | No | ◯ | ◯ | ◯ | Ink pH is controlled using BES/NaOH. |
| 6 | 1/10 | 2.2 | 38.0 | 2.10 | 7.9 | ◯ | ◯ | No | ◯ | ◯ | ◯ | Ink pH is controlled using LiOH. |
| 7 | 1/18 | 3.8 | 37.0 | 2.32 | 8.4 | ◯ | ◯ | No | ◯ | ◯ | ◯ | Ink pH is controlled using Tricine/KOH. |
| 8 | 1/15 | 1.6 | 53.0 | 1.85 | 7.2 | ◯ | ◯ | No | ◯ | ◯ | ◯ | Ink pH is controlled using TES/NaOH. |
| 9 | 3/20 | 1.53 | 50.0 | 1.51 | 7.0 | ◯ | ◯ | No | ◯ | ◯ | ◯ | Ink pH is controlled using ADA/LiOH. |
| 10 | 1/6 | 2.33 | 37.0 | 2.33 | 7.8 | ◯ | ◯ | No | ◯ | ◯ | ◯ | Ink pH is controlled using TAPS/LiOH. |

*1 Ratio by weight of (a) a dispersant containing at least one of a sulfonic acid group, sulfuric ester, and salt thereof to (b) a dispersant containing a carboxyl group or salt thereof
*2 Parts by weight based on 10 parts by weight of pigments
*3 Bicine: N,N-bis(2-hydroxyethyl)glycine
BES: N,N-bis(2-hydroxyethyl)-2-aminoethansulfonic acid
Tricine: tris(hydroxymethyl)-methylglycine
TES: N-tris(hydroxymethyl)methyl-2-aminoethanesulfonic acid
ADA: N-2-acetamide iminodiacetic acid
TAPS: N-tris(hydroxymethyl)methyl-3-aminopropanesulfonic acid

TABLE 7

| Comparative Example | *1 | Total amount of dispersants *2 | (1) Ink surface tension | (2) Ink viscosity | (3) Ink pH | (4) Dispersion stability | (5) Image quality test | (6) Fixation test on paper (Stains) | (7) Kogation test | (8) Clogging test Standing time test | (8) Clogging test Dischargeability test | Notes *3 |
|---|---|---|---|---|---|---|---|---|---|---|---|---|
| 1 | — | 2.67 | 52.0 | 1.36 | 8.2 | X | ◯ | Yes | △ | ◯ | X | Clogging in a stainless filter (10 μm) in an ink tank |

TABLE 7-continued

| Comparative Example | *1 | Total amount of dispersants *2 | (1) Ink surface tension | (2) Ink viscosity | (3) Ink pH | (4) Dispersion stability | (5) Image quality test | (6) Fixation test on paper (Stains) | (7) Kogation test | Standing time test | (8) Clogging test Dischargeability test | Notes *3 |
|---|---|---|---|---|---|---|---|---|---|---|---|---|
| 2 | — | 2.0 | 51.5 | 1.51 | 7.3 | Δ | ○ | No | X | X | X | Clogging in a stainless filter (10 μm) in an ink tank |
| 3 | — | 2.67 | 39.0 | 1.66 | 8.5 | X | ○ | Yes | Δ | Δ | X | Clogging in a stainless filter (10 μm) in an ink tank |
| 4 | — | 2.0 | 60.0 | 1.71 | 8.2 | Δ | ○ | No | X | X | X | Clogging in a stainless filter (10 μm) in an ink tank |
| 5 | 1/3 | 2.0 | 48.0 | 2.02 | 8.7 | Δ | ○ | Yes | Δ | Δ | Δ | Clogging in a stainless filter (10 μm) in an ink tank |
| 6 | 1/130 | 1.75 | 52.0 | 1.81 | 8.9 | Δ | ○ | No | Δ | Δ | Δ | Clogging in a stainless filter (10 μm) in an ink tank |

*1 Ratio by weight of (a) a dispersant containing at least one of a sulfonic acid group, sulfuric ester, and salt thereof to (b) a dispersant containing a carboxyl group or salt thereof
*2 Parts by weight based on 10 parts by weight of pigments From the comparison of Examples 1 to 10 and Comparative Examples 1 to 4, it is known that the examples can obtain more excellent results than the comparative examples each containing only one of the sulfonic-based dispersants and carboxyl-based dispersants in any of the dispersion stability, image quality, fixation on paper, kogation, and clogging. Further, from the comparison of Examples 1 to 10 and Comparative Examples 5 and 6, it is known that the examples in which the ratio by weight of the sulfonic-based dispersants to the carboxyl-based dispersants is in the range from 1:5 to 1:100 can obtain more excellent results than the comparative examples in which the ratio by weight of them is out of the above-mentioned range in dispersion stability, kogation, and clogging.

With the present invention, it is possible to provide an ink jet recording ink which has excellent dispersion stability in any environment, does not cause clogging even when it is allowed to stand for a long period of time, has extremely excellent fixation on various papers, does not deposit even when it is in contact with a metal or metal oxide for a long period of time, and also does not cause kogation.

What is claimed is:

1. An inkjet recording ink comprising water, a coloring material, (a) a dispersant containing at least one of a sulfonic acid group, sulfuric ester, and salt thereof, and (b) a dispersant containing a carboxyl group or salt thereof, wherein the ratio by weight of (a) to (b) is from 1:5 to 1:100, and the disdersants are each a high-molecular compound having a weight-average molecular weight of from 1.000 to 10,000.

2. The ink jet recording ink according to claim 1, wherein said coloring material is a pigment.

3. The ink jet recording ink according to claim 1, wherein the total amount of said dispersants is from 0.01 to 50 parts by weight based on 10 parts by weight of the coloring material.

4. The ink jet recording ink according to claim 1, wherein the pH thereof is from 7.0 to 10.0.

5. The ink jet recording ink according to claim 1, wherein the surface tension thereof is from 30 to 65 mN/m.

6. The ink jet recording ink according to claim 1, wherein the viscosity thereof is from 1.0 to 10.0 mPa·s.

7. An ink jet recording method which records images by discharging ink drops from an orifice in accordance with recording signals, wherein an ink jet recording ink comprising water, a coloring material, (a) a dispersant containing at least one of a sulfonic acid group, sulfuric ester, and salt thereof, and (b) a dispersant containing a carboxyl group or salt thereof, wherein the ratio by weight of (a) to (b) is from 1:5 to 1:100, is used as said ink, and the dispersants are each a high-molecular compound having a weight-average molecular weight of from 1.000 to 10,000.

8. The ink jet recording method according to claim 7, wherein said coloring material is a pigment.

9. The ink jet recording method according to claim 7, wherein the total amount of said dispersants is from 0.01 to 50 parts by weight based on 10 parts by weight of the coloring material.

10. The ink jet recording method according to claim 7, wherein the pH thereof is from 7.0 to 10.0.

11. The ink jet recording method according to claim 7, wherein the surface tension thereof is from 30 to 65 mN/m.

12. The ink jet recording method according to claim 7, wherein the viscosity thereof is from 1.0 to 10.0 mPa·s.

13. The ink jet recording method according to claim 7, wherein an ink is discharged using a heating means.

* * * * *